US008163155B2

(12) United States Patent
Chouai et al.

(10) Patent No.: US 8,163,155 B2
(45) Date of Patent: Apr. 24, 2012

(54) SULFO OR SULFAMYL GROUP-CONTAINING CATHODIC ELECTROCOAT RESIN

(75) Inventors: Abdellatif Chouai, Lake Jackson, TX (US); Timothy S December, Rochester Hills, MI (US)

(73) Assignee: BASF Coatings GmbH, Muenster (DE)

( * ) Notice: Subject to any disclaimer, the term of this patent is extended or adjusted under 35 U.S.C. 154(b) by 597 days.

(21) Appl. No.: 12/344,715

(22) Filed: Dec. 29, 2008

(65) Prior Publication Data

US 2010/0163417 A1    Jul. 1, 2010

(51) Int. Cl.
*B41M 5/20* (2006.01)
*C04B 9/02* (2006.01)
*C25D 3/56* (2006.01)

(52) U.S. Cl. ...... 205/50; 205/205.8; 205/298; 106/1.05; 106/14.05; 523/414; 252/391; 525/530

(58) Field of Classification Search .............. 205/50, 205/205, 80, 298; 525/530, 45, 414; 252/391, 252/389.32; 106/14.05; 523/414
See application file for complete search history.

(56) References Cited

U.S. PATENT DOCUMENTS

| 3,110,701 | A |   | 11/1963 | Wear |
|---|---|---|---|---|
| 3,814,156 | A | * | 6/1974 | Bachmann et al. ........... 411/258 |
| 4,065,315 | A | * | 12/1977 | Yamazaki et al. ........... 430/269 |
| 4,724,244 | A |   | 2/1988 | Kempter et al. |
| 4,816,502 | A | * | 3/1989 | Lopez ........................... 523/414 |
| 4,837,278 | A | * | 6/1989 | Cameron et al. .............. 525/162 |
| 4,849,283 | A | * | 7/1989 | Porter et al. .................. 428/323 |
| 5,202,051 | A | * | 4/1993 | Lopez ...................... 252/183.12 |
| 5,672,432 | A | * | 9/1997 | Harris et al. ............... 428/425.8 |
| 6,919,402 | B2 | * | 7/2005 | December .................... 524/504 |
| 7,211,203 | B2 | * | 5/2007 | Otsuki et ...................... 252/500 |
| 7,338,989 | B2 | * | 3/2008 | Gross et al. .................. 523/404 |
| 7,342,082 | B2 |   | 3/2008 | Benson et al. |
| 7,842,177 | B2 | * | 11/2010 | Tazzia .......................... 205/317 |
| 2008/0272005 | A1 |   | 11/2008 | Tazzia |

FOREIGN PATENT DOCUMENTS

| JP | 5975924 | 4/1984 |
|---|---|---|
| JP | 6038480 | 2/1985 |
| JP | 9025336 | 1/1997 |
| PL | 165052 | 11/1994 |

\* cited by examiner

*Primary Examiner* — Ana Fortuna

(74) *Attorney, Agent, or Firm* — Harness, Dickey & Pierce, P.L.C.

(57) ABSTRACT

A coating layer prepared from an aqueous electrodeposition coating composition comprising an electrodepositable binder, the binder comprising a sulfo or sulfamyl group-containing resin, provides corrosion protection to a metallic substrate.

19 Claims, No Drawings

SULFO OR SULFAMYL GROUP-CONTAINING CATHODIC ELECTROCOAT RESIN

FIELD OF THE DISCLOSURE

The invention relates to electrocoat coating compositions, methods of preparing them, methods of electrodeposition of coatings onto a conductive substrate, and electrodeposited coatings.

BACKGROUND OF THE DISCLOSURE

The statements in this section merely provide background information related to this disclosure and may not constitute prior art.

Industrial coating of metal articles that will be used in corrosive environments may include application of one or more inorganic and organic treatments and coatings. Painting systems ("paint shops") in automotive assembly plants are large, complex, and expensive. Metal automotive vehicle bodies (the "body-in-white") and parts, for instance, are given a many-step treatment of cleaning in one or more cleaning baths or spray tanks, application of an aqueous phosphate coating material as a metal pretreatment step in a phosphating bath, then various rinses and additional finishing treatments, such as described in Claffey, U.S. Pat. No. 5,868,820. The phosphating pre-treatment steps are undertaken to improve corrosion resistance of the metal and adhesion of subsequent coatings to the metal. The cleaning and phosphating steps may have 10 or 12 individual treatment stations of spray equipment or dip tanks.

An electrodeposition coating ("electrocoat") is applied after the pretreatment steps to the metal vehicle body. Electrocoat baths usually comprise an aqueous dispersion or emulsion of a principal film-forming resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness. The phosphate pre-treatment, however, has up to now been an indispensable step in protecting against corrosion for automotive vehicle bodies.

Benson et al., U.S. Pat. No. 7,342,082 discloses a thermoset system of polymers having pendant acylsulfonamide groups that can be used as an amine capture agent, e.g., for to immobilize analytes, amino acids, DNA and RNA fragments, organelles, or immunoglobins on a surface. Wear, U.S. Pat. No. 3,110,701 discloses a thermosetting composition containing poly(benzosulfimido) group-containing compounds and polyfunctional primary aliphatic amines that can be applied to fabrics and other materials of organic character, such as clot-insulated wire or to metals to provide tough, adherent uniform coatings with excellent resistance to corrosion. A copolymer of poly(benzosulfimido) group-containing compounds and polyfunctional primary aliphatic amines is disclosed. The poly(benzosulfimido) group-containing compounds are formed by polyhalo compounds and sodium salt of saccharin.

SUMMARY OF THE DISCLOSURE

We disclose a composition and process for electrodepositing an electrocoat coating on a metal substrate, such as an unphosphated metal substrate (that is, a metal substrate that has not undergone a phosphate pretreatment), in which the electrocoat coating provides excellent corrosion protection.

The process uses an aqueous electrocoat coating composition, also called an electrocoat bath, with a binder comprising a cathodically electrodepositable resin having at least one sulfo or sulfamyl (also called sulfamoyl) group

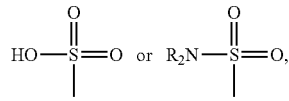

in which the anion may be satisfied by a hydrogen (as shown in the acid structure) or other cationic species and in which each R is independently a lower hydrocarbyl radical, particularly $C_1$ to $C_4$. For convenience, "resin" is used in this disclosure to encompass resin, oligomer, and polymer. "Binder" refers to the film-forming components of the coating composition. Typically the binder is thermosetting or curable.

In one embodiment, the sulfo or sulfamyl group-containing resin is an amine-functional (for cathodic electrodeposition) or carboxyl-functional (for anodic electrodeposition) resin with a plurality of sulfo groups, sulfamyl groups, or a combination of sulfo and sulfamyl groups.

The sulfo or sulfamyl group-containing resin may be an epoxy resin, an acrylic resin, a polyester resin, a polyurethane resin, or a polybutadiene, polyisoprene, or other epoxy-modified rubber-based polymer.

In certain embodiments, the sulfo or sulfamyl group-containing resin is electrodepositable and may be from about 0.01 to about 99% by weight of the total binder in the electrodeposition coating composition. Among these embodiments are those in which the sulfo or sulfamyl group-containing resin is from about 1 to about 90% by weight of total binder in the electrodeposition coating composition and those in which the sulfo or sulfamyl group-containing resin is from about 5 to about 80% by weight of total binder in the electrodeposition coating composition.

In certain embodiments, the binder comprises a crosslinker for the sulfo or sulfamyl group-containing resin. In certain embodiments, the binder comprises a second electrodepositable resin other than the sulfo or sulfamyl group-containing resin. In any of these embodiments, the binder may also comprises a crosslinker which reacts during cure of the electrodeposited coating layer with the sulfo or sulfamyl group-containing resin, the second, electrodepositable resin, or both. In these embodiments, the sulfo or sulfamyl group-containing resin is electrodepositable and may be from about 0.01 to about 30% by weight of the total binder and the second, electrodepositable resin may be from about 40 to about 80% by weight of the total binder in the electrodeposition coating composition. The sulfo or sulfamyl group-containing resin may also be from about 1 to about 30% by weight or from about 5 to about 20% by weight of total binder in the electrodeposition coating composition and the second, electrodepositable resin may be from about 45 to about 75% by weight or from about 50 to about 70% by weight of the total binder in the electrodeposition coating composition.

We also disclose a method of coating an electrically conductive substrate, such as a metal automotive vehicle body or part, which comprises placing the electrically conductive substrate into the aqueous electrodeposition coating composition having an electrodepositable binder comprising a sulfo or sulfamyl group-containing resin and, using the electrically conductive substrate as the cathode, passing a current through the aqueous electrodeposition coating composition to deposit a coating layer comprising the binder onto the electrically conductive substrate. The deposited coating layer may then be cured to a cured coating layer. Subsequent coating layers may be applied on the (optionally cured) electrodeposited coating layer. For example, the electrodeposited coating layer may have other layers such as an optional spray-applied primer surfacer and a topcoat layer or topcoat layers (e.g., a colored basecoat layer and a clearcoat layer) applied over the electrodeposited coating layer.

In one embodiment of the method, the electrically conductive substrate is unphosphated before it is coated with an electrodeposited coating comprising the sulfo or sulfamyl group-containing resin; that is, the substrate is free of a phosphate pre-treatment.

In one embodiment of the method, a metal automotive vehicle body is cleaned, and the cleaned metal automotive vehicle body is electrodeposited with an aqueous coating composition comprising the sulfo or sulfamyl group-containing resin. Thus, no phosphate pretreatment is used. The sulfo or sulfamyl group-containing resin may be electrodepositable or the binder of the electrocoat coating composition may include a second electrodepositable resin that does not have sulfo or sulfamyl groups or both, and generally a crosslinker reactive with one or both resins is included in the coating composition so that the electrodeposited coating layer may be cured.

A coated, electrically conductive substrate comprises an electrically deposited coating layer on the substrate, the electrically deposited coating layer comprising a cured coating formed from a binder comprising a sulfo or sulfamyl group-containing resin. In various embodiments, the binder further comprises a crosslinker reactive with the sulfo or sulfamyl group-containing resin, a second, electrodepositable resin, or both that reacts during cure to form the cured coating.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A metal substrate, which may be unphosphated, is electrocoated with an aqueous electrocoat coating composition having a binder comprising a sulfo or sulfamyl group-containing resin. The binder comprises at least one electrodepositable resin having amine salted carboxyl groups or acid salted amine groups, which electrodepositable resin may be the sulfo or sulfamyl group-containing resin or a second, different resin. The electrodeposited coating layer may be cured and may be overcoated with one or more additional coating layers. The sulfo or sulfamyl group-containing resin has at least one covalently bonded group having a structure selected from

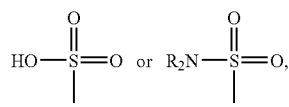

in which the anion may be satisfied by a hydrogen (as shown in the acid structure) or other cationic species and in which each R is independently a lower hydrocarbyl radical, particularly $C_1$ to $C_4$.

The sulfo or sulfamyl group-containing resin may be prepared using any resin or polymerizable monomer that may be adducted with the sulfo or sulfamyl group. Electrocoat coating binders often include epoxy or acrylic resins, and the sulfo or sulfamyl group-containing resin may, for example, be an epoxy resin, acrylic polymer, polyester, polyurethane, or a polybutadiene, polyisoprene, or other epoxy-modified rubber-based polymer.

The sulfo or sulfamyl group-containing resin may be prepared by reaction of a resin having an active hydrogen-containing group such as a hydroxyl group or secondary amine group with an alkane sultone (i.e., a cyclic ester of a hydroxyalkylsulfonic acid), 2-sulfobenzoic acid anhydride, or 2-benzoic sulfimide (saccharin). Alternatively, the sulfo or sulfamyl group-containing resin may be prepared by reaction of a monomer having an active hydrogen-containing group such as a hydroxyl group with an alkane sultone, 2-sulfobenzoic acid anhydride, or 2-benzoic sulfimide (which we will refer to "reactant providing the sulfo or sulfamyl group") then polymerization of the monomer to form the sulfo or sulfamyl group-containing resin. In either case, the reaction of the active hydrogen group with the reactant providing the sulfo or sulfamyl group (alkane sultone, 2-sulfobenzoic acid anhydride, or 2-benzoic sulfimide) may be carried out typically at about 90-150° C. for about 0.5 to 3 hours in the presence of a base. The sulfo or sulfamyl group-containing resin may include a plurality of sulfo and/or sulfamyl groups.

In a first embodiment, the sulfo or sulfamyl group-containing resin is an epoxy resin. The sulfo or sulfamyl group-containing epoxy resin may be prepared by first preparing an epoxy resin by reaction of a polyepoxide with an optional extender and/or optional other reactants such as monofunctional or tri- or higher-functional reactants, optionally including in this reaction step a monomer that provides carboxyl or amine functionality or reacting the product of this reaction step with a monomer that provides carboxyl or amine functionality, then reacting the product epoxy resin with a reactant providing the sulfo or sulfamyl group. In a second method, the sulfo or sulfamyl group-containing epoxy resin may be prepared by including the reactant providing the sulfo or sulfamyl group in the step of reacting the polyepoxide with an extender or by including the reactant providing the sulfo or sulfamyl group in a later step in which a polyepoxide-extender product is reacted with a monomer that provides carboxyl or amine functionality. In a third method, the sulfo or sulfamyl group-containing epoxy resin may be prepared by a reaction as previously outlined but in which at least one of the polyepoxide, extender, monofunctional or trifunctional reactant, or monomer that provides carboxyl or amine functionality is a product of a reaction with the reactant providing the sulfo or sulfamyl group (i.e., one of the monomers forming the epoxy resin is pre-reacted with the reactant providing the sulfo or sulfamyl group).

Suitable, nonlimiting examples of polyepoxide resins include epoxy resins with a plurality of epoxide groups, such as diglycidyl aromatic compounds such as the diglycidyl ethers of polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl)methane, 1,1-bis(4hydroxyphenyl)isobutane, 2,2-bis(4-hydroxy-tert-butylphenyl)propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like, including diglycidyl ethers of bisphenol A and bisphenol A-based resins having a structure

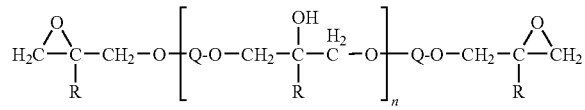

wherein Q is

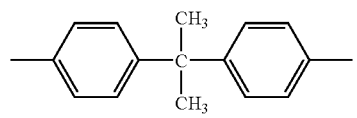

R is H, methyl, or ethyl, and n is an integer from 0 to 10. In certain embodiments, n is an integer from 1 to 5. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl)propane, and the like. Diglycidyl esters of dicarboxylic acids can also be used as polyepoxides. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups. The polyepoxide may be provided with the sulfo or sulfamyl group by reaction of a hydroxyl group with the reactant providing the sulfo or sulfamyl group, for example a hydroxyl group as shown in the structure above for bisphenol A-based resins or with a hydroxyl group, from one up to all but two hydroxyl groups, of a polyol that is then etherified with epihalohydrin to form a polyglycidyl ether or all but one hydroxyl group of a polyol, which is etherified to form a monoglycidyl ether.

The polyepoxide (and any optional monoepoxide) may be reacted with an extender to prepare a resin having a higher molecular weight having beta-hydroxy ester linkages. Suitable, nonlimiting examples of extenders include polycarboxylic acids, polyols, polyphenols, and amines having two or more amino hydrogens, especially dicarboxylic acids, diols, diphenols, and diamines. Particular, nonlimiting examples of suitable extenders include diphenols, diols, and diacids such as those mentioned above in connection with forming the polyepoxide; polycaprolactone diols, and ethoxylated bisphenol A resins such as those available from BASF Corporation under the trademark MACOL®. Other suitable extenders include, without limitation, carboxy- or amine-functional acrylic, polyester, polyether, and epoxy resins and polymers. Still other suitable extenders include, without limitation, polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl)propane-1,3-diamine, and polyoxyalkylene amines such as those available from BASF AG under the trademark POLYAMIN® or from Huntsman under the trademark JEFFAMINE®. The product of the reaction of polyepoxide and extender will be epoxide-functional when excess equivalents of polyepoxide are reacted or will have the functionality of the extender when excess equivalents of extender are used.

The extender may be provided with the sulfo or sulfamyl group by reaction of a hydroxyl group or amine group of a compound with three or more hydroxyl and amine groups with the reactant providing the sulfo or sulfamyl group so that the reaction product is left with two unreacted hydroxyl groups, amine groups, or combined hydroxyl and amine groups. In certain embodiments, a phenol-functional extender can be provided with the sulfo or sulfamyl group by reaction of the phenolic OH group with the reactant providing the sulfo or sulfamyl group.

A monofunctional reactant may optionally be reacted with the polyepoxide resin and the extender or after reaction of the polyepoxide with the extender to prepare the epoxy resin. Suitable, nonlimiting examples of monofunctional reactants include phenol, alkylphenols such as nonylphenol and dodecylphenol, other monofunctional, epoxide-reactive compounds such as dimethylethanolamine and monoepoxides such as the glycidyl ether of phenol, the glycidyl ether of nonylphenol, or the glycidyl ether of cresol, and dimer fatty acid. A monofunctional reactant having one or more sulfo and/or sulfamyl groups may be prepared by reacting the reactant providing the sulfo or sulfamyl group with one or more suitable functional groups of a compound while leaving one epoxide-reactive or epoxide group unreacted. A nonlimiting example is reaction of all but one hydroxyl or amine group of one of the extender compounds.

Useful catalysts for the reaction of the polyepoxide resin with the extender and optional monofunctional reactant include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide.), tin and/or phosphorous complex salts (e.g., $(CH_3)_3$ SNI, $(CH_3)_4$ PI, triphenylphosphine, ethyltriphenyl phosphonium iodide, tetrabutyl phosphonium iodide) and so on. It is known in the art that tertiary amine catalysts may be preferred with some reactants. The reaction may be carried out at a temperature of from about 100° C. to about 350° C. (in other embodiments 160° C. to 250° C.) in solvent or neat. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The epoxy resin may be reacted with the reactant providing the sulfo or sulfamyl group during, or after reaction of the polyepoxide resin with the extender and optional monofunctional reactant. The epoxy resin may also be reacted with the reactant providing the sulfo or sulfamyl group and optionally a monofunctional reactant such as those already described and not be reacted with an extender.

An amine-functional or carboxyl-functional epoxy resin has at least one amine or carboxyl group, and this amine or carboxyl functionality may introduced during or after reaction of the polyepoxide with the extender. The amine or carboxyl functionality may be introduced by reaction of the polyepoxide resin with an extender having a tertiary amine or having carboxyl groups (where not all are reacted with epoxide groups, i.e., carboxyl equivalents are in excess relative to epoxide equivalents) or with a monofunctional reactant having a tertiary amine group. The amine or carboxyl functionality may be introduced after reaction of the polyepoxide and extender when the product is epoxide-functional by reaction of the epoxide-functional product with a reactant having a tertiary amine or with an excess of reactant having a plurality of carboxyl groups Suitable, nonlimiting examples of extenders and monofunctional reactants having an amine group include diethanolamine, dipropanolamine, diisopropanolamine, dibutanolamine, diisobutanolamine, diglycolamine, methylethanolamine, dimethylaminopropylamine, diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, methylethanolamine, aminoethylethanolamine, aminopropylmonomethylethanolamine, polyoxyalkylene amines. and compounds having a primary amine group that has been protected by forming a ketimine, such as a reaction product of 1 mole diethylenetriamine and 2 moles methyl isobutyl ketone. Suitable, nonlimiting examples of extenders and monofunctional reactants having a carboxyl group include compounds of the formula HOR-COOH, in which R is an alkylene group of from 1 to 12 carbon atoms (in certain embodiments an alkylene group of from 2 to 8 carbon atoms) and amine salts of these. Nonlimiting examples include lactic acid, glycolic acid, and hydroxyl stearic acid. Polyacids such a malic acid and citric acid may also be used. If the epoxy resin has amine functionality, it is cathodically electrodepositable; if the epoxy resin has carboxyl functionality, it is anodically electrodepositable. If the sulfo or sulfamyl functional epoxy resin does not have amine or carboxyl functionality, it is combined in the electrocoat coating composition binder with a second resin that is electrodepositable.

In a first particular embodiment, bisphenol A, the diglycidyl ether of bisphenol A, and phenol are reacted in a first step to form a epoxide functional extended resin; the epoxide functional extended resin, diethanolamine, and dimethylaminopropylamine are reacted in a second step to form an amine-functional epoxy resin; and the amine-functional epoxy resin is reacted with 2-sulfobenzoic acid anhydride in a third step to form a sulfo group-containing, amine-functional epoxy resin. The sulfo group-containing, amine-functional epoxy resin may have a monomer unit

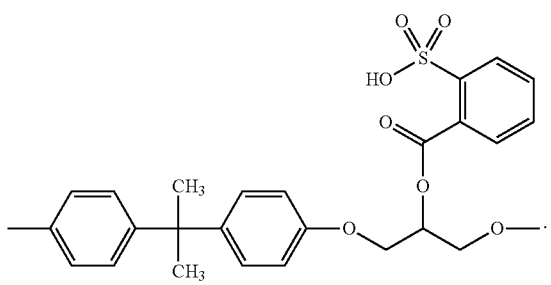

In an aqueous electrocoat coating composition, the acid group is ionized, being neutralized by a salting base. In a second particular embodiment, an amine-functional epoxy resin is formed according to the first and second steps of the first particular embodiment, then the amine-functional epoxy resin is reacted with 2-benzoic sulfaimide in a third step to form a sulfamyl group-containing, amine-functional epoxy resin. The sulfo group-containing, amine-functional epoxy resin may have a monomer unit

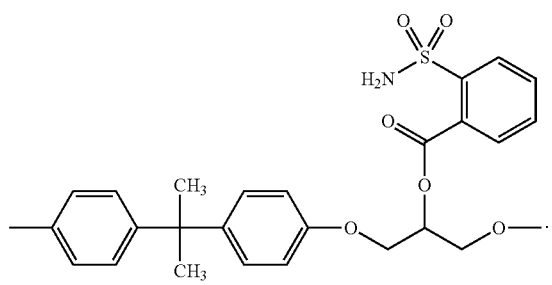

In an aqueous electrocoat coating composition, the amine group is ionized, being neutralized by a salting acid.

In a second embodiment, the sulfo or sulfamyl group-containing resin is a vinyl polymer, such as an acrylic polymer. The sulfo or sulfamyl group-containing acrylic polymer may be prepared by polymerization of a comonomer having a sulfo or sulfamyl group or by reaction of an acrylic polymer having active hydrogen functionality with the reactant providing the sulfo or sulfamyl group. Nonlimiting examples of monomers that may be reacted with the reactant providing the sulfo or sulfamyl group before polymerization or that may be polymerized to provide a group to be reacted with the reactant providing the sulfo or sulfamyl group after polymerization include addition polymerizable monomers having hydroxyl groups. Specific, nonlimiting examples include hydroxyl-functional ethylenically unsaturated monomers such as hydroxyethyl methacrylate, hydroxyethyl acrylate, hydroxypropyl acrylate, hydroxypropyl methacrylate, hydroxybutyl acrylate, hydroxybutyl methacrylate, and the reaction product of methacrylic acid with styrene oxide.

Vinyl or acrylic resins may be made cathodically electrodepositable by incorporation of an amine-containing monomer, such as acrylamide, methacrylamide, N,N'-dimethylaminoethyl methacrylate tert-butylaminoethyl methacrylate. 2-vinylpyridine, 4-vinylpyridine, or vinylpyrrolidine, or may be made anodically electrodepositable by incorporation of a carboxyl-containing monomer, such as acrylic acid, methacrylic acid, crotonic acid, maleic anhydride or acid, fumaric acid, isocrotonic acid, vinylacetic acid, and itaconic acid or anhydride, or monoesters of dicarboxylic acids such as monomethyl maleate, monobutyl maleate, and monopropyl itaconate. Alternatively, epoxide groups may be incorporated by including an epoxide-functional monomer such as glycidyl acrylate, glycidyl methacrylate, or allyl glycidyl ether in the polymerization reaction, then be made cathodically electrodepositable by reaction of the epoxide groups with amines according to the methods previously described for the epoxy resins.

A monomer that will provide functionality for crosslinking, in other words a monomer having a group reactive with a crosslinker in the binder, is generally copolymerized in forming the vinyl or acrylic polymer. Among suitable monomers are those already mentioned as having an active hydrogen group reactive with the reactant providing the sulfo or sulfamyl group, which may be used in excess of those that will be provided with the sulfo or sulfamyl group to leave adducted active hydrogen groups for crosslinking. Of particular note are monomers containing hydroxyl groups. Also useful for providing crosslinking groups are the acid-, amine-, or epoxide-functional monomers already mentioned.

The monomer bearing the sulfo or sulfamyl group or active hydrogen group reactive with the reactant providing the sulfo or sulfamyl group (e.g., hydroxyl group) and the optional monomer bearing the group for electrodeposition (amine for a cationic group or acid or anhydride for anionic group) and/or monomer being a group for crosslinking the coating may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, diesters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

In a particular embodiment, a vinyl or acrylic polymer has monomer units having amine functionality, hydroxyl functionality, and sulfo or sulfamyl groups. The sulfo or sulfamyl monomer units may have one of the following structures:

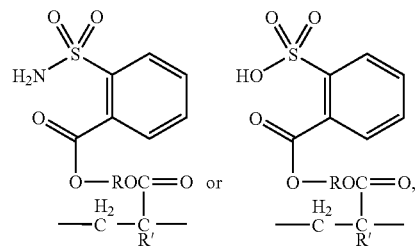

in which R is an alkylene group, preferably having one to four carbon atoms, and R' is H or methyl.

The sulfo or sulfamyl group-containing resin is used to prepare an electrocoat coating composition (also known as an electrocoat bath). In general, a binder is prepared comprising the sulfo or sulfamyl group-containing resin, then the binder is dispersed in an aqueous medium by salting ionizable groups present in the binder. When the sulfo or sulfamyl group-containing resin is not electrodepositable by itself, then a second, electrodepositable resin is included in the binder; the second, electrodepositable resin may be included in the binder even when the sulfo or sulfamyl group-containing resin is electrodepositable. Generally, it is desirable to crosslink the electrodeposited coating to a cured coating layer, and a crosslinker (also called curing agent or crosslinking agent) is generally included in the binder for this purpose. The crosslinker may react under curing conditions with the sulfo or sulfamyl group-containing resin, the optional second, electrodepositable resin, and/or an optional further resin included in the coating composition binder.

A second, electrodepositable resin may be an epoxy resin, acrylic polymer, polyester, polyurethane, or a polybutadiene, polyisoprene, or other epoxy-modified rubber-based polymer, in which the resin has amine functionality (to be cathodically electrodepositable) or carboxyl functionality (to be anodically electrodepositable). Such resins may be prepared according to the methods outlined above regarding preparation of the sulfo or sulfamyl group-containing resin, without adducting the resin with the sulfo or sulfamyl groups or including the sulfo or sulfamyl group-containing monomers in polymerization. Further details of preparation are readily available in the art, particularly in existing patent documents. Cationic polyurethanes and polyesters may also be used. Such materials may be prepared by endcapping with, for example, an aminoalcohol or, in the case of the polyurethane, the same compound comprising a saltable amine group previously described may also be useful. Polybutadiene, polyisoprene, or other epoxy-modified rubber-based polymers can be used as the resin in the present invention. The epoxy-rubber can be capped with a compound comprising a saltable amine group.

In certain embodiments, the sulfo or sulfamyl group-containing resin is electrodepositable and is present in an amount from about 0.01 to about 99% by weight of binder in the electrodeposition coating composition. The electrodepositable sulfo or sulfamyl group-containing resin may be present in an amount from about 1 to about 90% by weight of binder or from about 5 to about 80% by weight of binder in the electrodeposition coating composition. In other embodiments, the sulfo or sulfamyl group-containing resin is not electrodepositable and is present in an amount from about 0.01 to about 30% by weight of binder, from about 1 to about 30% by weight of binder, or from about 5 to about 20% by weight of binder in the electrodeposition coating composition. When the sulfo or sulfamyl group-containing resin is not electrodepositable, the second, electrodepositable resin is present in an amount from about 40 to about 80% by weight of binder, from about 45 to about 75% by weight of binder, or from about 50 to about 70% by weight of binder in the electrodeposition coating composition.

A crosslinker is selected according to groups available on the resin or resins of the binder for crosslinking during curing of a coating layer formed on a substrate. The art describes many considerations in selecting crosslinkers. Crosslinkers that reactive with active hydrogen groups on the resin or resin(s) are most commonly used, and of these polyisocyanates (particularly blocked polyisocyanates) and aminoplasts may be mentioned in particular. Nonlimiting examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropylcyclohexyl isocyanate, dicyclohexylmethane 2,4'-diisocyanate, 1,3-bis (iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4,4',4"-triisocyanate, or mixtures of these polyisocyanates. Suitable polyisocyantes also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

Nonlimiting Examples of Aminoplasts Include

As understood by those skilled in the art, an aminoplast resin is formed by the reaction product of formaldehyde and amine where the preferred amine is a urea or a melamine. Although urea and melamine are the preferred amines, other amines such as triazines, triazoles, diazines, guanidines, or guanamines may also be used to prepare the aminoplast resins. Furthermore, although formaldehyde is preferred for forming the aminoplast resin, other aldehydes, such as acetaldehyde, crotonaldehyde, and benzaldehyde, may also be used. Nonlimiting examples of suitable aminoplast resins include monomeric or polymeric melamine-formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

The binder may include one or more additional resins. Nonlimiting examples of suitable additional resins include epoxy resins, polyesters, polyurethanes, vinyl resins such as acrylic polymers, and polybutadiene resins. The additional resin may be, for example, any of the polyepoxide resins, extended polyepoxide resins, or epoxide-functional resins already mentioned, optionally reacted with a compound having at least one epoxide-reactive group.

Optionally, plasticizer or solvents or both can be included in the elecrocoat coating composition. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally between about 0 to 15 percent by weight, preferably about 0.5 to 5 percent by weight based on total weight of the resin solids. Plasticizers can be used at levels of up to 15 percent by weight resin solids.

The binder is emulsified in water in the presence of a salting acid or base. Nonlimiting examples of suitable acids include phosphoric acid, phosphonic acid, propionic acid, formic acid, acetic acid, lactic acid, or citric acid. Nonlimiting examples of suitable bases include Nonlimiting examples of suitable bases include Lewis and Brönstead bases including amines and hydroxide compounds such as potassium hydroxide and sodium hydroxide. Illustrative amines include N,N-dimethylethylamine (DMEA), N,N-diethylmethylamine, triethylamine, triethanolamine, triisopropylamine, dimethylethanolamine, diethylethanolamine, diisopropylethanolamine, dibuthylethanolamine, methyldiethanolamine, dimethylisopropanolamine, methyldiisopropanolamine, dimethilethanolamine, and the like. In certain preferred embodiments the amines are tertiary amines such as dimethylethylamine and dimethylethanolamine. The salting acid or base may be blended with the binder, mixed with the water, or both, before the binder is added to the water. The acid or base is used in an amount sufficient to neutralize enough of the ionizable resin groups to impart water-dispersibility to the binder. The ionizable groups may be fully neutralized; however, partial neutralization is usually sufficient to impart the required water-dispersibility. By saying that the resin is at least partially neutralized, we mean that at least one of the saltable groups of the binder is neutralized, and up to all of such groups may be neutralized. The degree of neutralization that is required to afford the requisite water-dispersibility for a particular binder will depend upon its composition, molecular weight of the resins, weight percent of amine-functional resin, and other such factors that can readily be determined by one of ordinary skill in the art through straightforward experimentation.

The degree to which the ionizable groups are neutralized or salted depends on a desired balance between solubility of the resin and the need to maintain low conductivity in the electrocoat bath for deposition of the electrocoat composition. In general, the resin bearing the sulfo or sulfamyl groups need only be partially neutralized. In some embodiments, from 40 to 80% of the ionizable or saltable groups will be salted; in some embodiments, from 50 to 70% of the ionizable or saltable groups will be salted. In some anodic embodiments, the meq acid of the electrodepositable resin or resins may be from 0.45 to 0.85 meq acid/gram solids; in some anodic embodiments, the meq base of the electrodepositable resin or resins may be from 0.2 to 0.7 meq base/gram solids. Optimum levels of acid or basic groups on the electrodepositable resin or resins can be determined by straightforward experimentation.

The binder emulsion is then used in preparing an electrocoat coating composition (or bath). The electrocoat bath may contain no pigment so as to produce a colorless or clear electrodeposited coating layer, but the electrocoat bath usually includes one or more pigments, separately added as part of a pigment paste, and may contain any further desired materials such as coalescing aids, antifoaming aids, and other additives that may be added before or after emulsifying the resin. Conventional pigments for electrocoat primers include titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included. Inorganic extenders such as clay and anti-corrosion pigments are commonly included.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat coating composition is electrodeposited onto a metallic substrate and then cured to form a cured coating layer of a coated article. The electrodeposition of the coating preparations according to the invention may be carried out by processes known to those skilled in the art. The electrodeposition coating composition may be applied on any conductive substrate, such as steel, copper, aluminum, or other metals or metal alloys, preferably to a dry film thickness of 10 to 35 µm. In one embodiment of the method, the electrically conductive substrate is unphosphated; that is, it is free of a phosphate pre-treatment The article coated with the composition of the invention may be a metallic automotive part or body. A method of coating an electrically conductive substrate, such as a metal automotive vehicle body or part, comprises placing an electrically conductive substrate, cleaned but preferably not given a phosphate pre-treatment, into the electrocoat coating composition and, using the electrically conductive substrate as the cathode, passing a current through the electrocoat coating composition causing a coating layer to deposit onto the electrically conductive substrate. After application, the coated article is removed from the bath and rinsed with deionized water. The coating may be cured under appropriate conditions, for example by baking at from about 275° F. to about 375° F. for between about 15 and about 60 minutes. Coating layers may be applied similarly from anodically depositable electrocoat coating compositions by using the electrically conductive substrate as the anode.

An automotive vehicle body may be electrocoated. The automotive vehicle body is cleaned, and the cleaned metal automotive vehicle body is electrocoated with an aqueous electrodeposition coating composition comprising the phosphorylated resin.

One or more additional coating layers, such as a spray-applied primer-surfacer, single topcoat layer, or composite color coat (basecoat) and clearcoat layer, may be applied over the electrocoat layer. A single layer topcoat is also referred to as a topcoat enamel. In the automotive industry, the topcoat is typically a basecoat that is overcoated with a clearcoat layer. A primer surfacer and the topcoat enamel or basecoat and clearcoat composite topcoat may be waterborne, solventborne, or a powder coating, which may be a dry powder or an aqueous powder slurry.

The composite coating of the invention may have, as one layer, a primer coating layer, which may also be termed a primer-surfacer or filler coating layer. The primer coating layer can be formed from a solventborne composition, waterborne composition, or powder composition, including powder slurry composition. The primer composition preferably has a binder that is thermosetting, although thermoplastic binders are also known. Suitable thermosetting binders may have self-crosslinking polymers or resins, or may include a crosslinker reactive with a polymer or resin in the binder. Nonlimiting examples of suitable binder polymers or resins include acrylics, polyesters, and polyurethanes. Such polymers or resins may include as functional groups hydroxyl groups, carboxyl groups, anhydride groups, epoxide groups, carbamate groups, amine groups, and so on. Among suitable crosslinkers reactive with such groups are aminoplast resins (which are reactive with hydroxyl, carboxyl, carbamate, and amine groups), polyisocyanates, including blocked polyisocyanates (which are reactive with hydroxyl groups and amine groups), polyepoxides (which are reactive with carboxyl, anhydride, hydroxyl, and amine groups), and polyacids and polyamines (which are reactive with epoxide groups). Examples of suitable primer compositions are disclosed, for example, in U.S. Pat. Nos. 7,338,989; 7,297,742; 6,916,877; 6,887,526; 6,727,316; 6,437,036; 6,413,642; 6,210,758; 6,099,899; 5,888,655; 5,866,259; 5,552,487; 5,536,785; 4,882,003; and 4,190,569, each assigned to BASF and each incorporated herein by reference.

The primer coating composition applied over the electrocoat primer may then be cured to form a primer coating layer. The electrocoat primer may be cured at the same time as the primer coating layer in a process known as "wet-on-wet" coating.

A topcoat composition may be applied over the electrocoat layer or primer coating layer and, preferably, cured to form a topcoat layer. In a preferred embodiment, the electrocoat layer or primer layer is coated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions, solventborne compositions, and powder and powder slurry compositions. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are among preferred polymers for topcoat binders. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin. Examples of suitable topcoat compositions are disclosed, for example, in U.S. Pat. Nos. 7,375,174; 7,342,071; 7,297,749; 7,261,926; 7,226,971; 7,160,973; 7,151,133; 7,060,357; 7,045,588; 7,041,729; 6,995,208; 6,927,271; 6,914,096; 6,900,270; 6,818,303; 6,812,300; 6,780,909; 6,737,468; 6,652,919; 6,583,212; 6,462,144; 6,337,139; 6,165,618; 6,129,989; 6,001,424; 5,981,080; 5,855,964; 5,629,374; 5,601,879; 5,508,349; 5,502,101; 5,494,970; 5,281,443; and, each assigned to BASF and each incorporated herein by reference.

The further coating layers can be applied to the electrocoat coating layer according to any of a number of techniques well-known in the art. These include, for example, spray coating, dip coating, roll coating, curtain coating, and the like. For automotive applications, the further coating layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

A primer layer may be cured before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The primer layer can also be applied to an uncured electrocoat coating layer, and all layers cured together.

The coating compositions described are preferably cured with heat. Curing temperatures are preferably from about 70° C. to about 180° C., and particularly preferably from about 170° F. to about 200° F. for a topcoat or primer composition including an unblocked acid catalyst, or from about 240° F. to about 275° F. for a topcoat or primer composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following example. The example is merely illustrative and does not in any way limit the scope of the invention as described and claimed. All parts are parts by weight unless otherwise noted.

EXAMPLES

Preparation A: Preparation of Binder Emulsion with 2-Sulfobenzoic Acid Anhydride The following materials are combined in a 3-L flask equipped with stirring and a heating mantle:
diglycidyl ether of bisphenol A (DGEBA), (18.03 parts),
bisphenol A (BPA), (4.1 parts),
phenol (1.41 parts), and
propylene glycol n-butyl ether (0.36 parts)

While stirring, the temperature is raised to 257° F. (125° C.). Subsequently, triphenylphosphine (0.04 parts) is added and an exotherm is recorded as 392° F. (200° C.). The mixture is then allowed to cool to 275° F. (135° C.); after 45 minutes a weight per epoxide (WPE) determination (target=525±25) is conducted with a measured WPE of 533. After cooling to 194° F. (90° C.) and turning off the heating mantle, 1.73 parts of diethanolamine is introduced and an exotherm is recorded as 241° F. (116° C.). The reaction mixture is allowed to stir for an additional 30 minutes at 221° F. (105° C.) after reaching exotherm. After stirring for 30 minutes, 3-dimethylaminopropylamine is added at 221° F. (105° C.) (0.84 parts), and the exotherm is recorded as 302° F. (150° C.). The mixture is stirred for an additional hour. Then, 1.13 parts of 2-sulfobenzoic acid anhydride is added at 275° F. (135° C.) and the resulting mixture is stirred for 1.5 hours at 266° F. (135° C.). Next, 2.36 parts of Pluracol® 710R (sold by BASF Corporation) is added followed by a crosslinker (a blocked isocyanate based on polymeric MDI and monofunctional alcohols) (13.6 parts). The mixture is stirred for 30 minutes at 221-230° F. (105-110° C.).

After achieving a homogeneous mixture, the resins and crosslinker, blend are added with constant stirring to an acid/water mixture of deionized water (34.95 parts) and formic acid (88%) (0.62 parts). After thoroughly mixing all components using a metal spatula, the solids are further reduced by addition of water (18.55 parts). A flow-additive package (2.51 parts) is added to the acid mixture. All raw materials, including the various solvents used above, are industrial grade and no further purifications are made.

Preparation B: Grinding Resin Having Tertiary Ammonium Groups

In accordance with EP 0 505 445 B 1, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol, and 206 parts of butyl glycol in a stainless steel reaction vessel in the presence of 4 parts of triphenylphosphine at 130° C. until an EEW of 865 g/eq is reached. In the course of cooling, the batch is diluted with 849 parts of butyl glycol and 1534 parts of D.E.R® 732 (polypropylene glycol diglycidyl ether, DOW Chemical, USA) and is reacted further at 90° C. with 266 parts of 2,2'aminoethoxyethanol and 212 parts of N,N-dimethylaminopropylamine. After two hours, the viscosity of the resin solution is constant (5.3 dPas; 40% in Solvenon® PM (methoxypropanol), available from BASF AG, Germany; cone and plate viscometer at 23° C.). It is diluted with 1512 parts of butyl glycol and the base groups are partly neutralized with 201 parts of glacial acetic acid, and the product is diluted further with 1228 parts of deionized water and discharged. This gives a 60% strength aqueous-organic resin solution whose 10% dilution has a pH of 6.0. The resin solution is used in direct form for paste preparation.

Preparation C: Pigment Paste

A premix is first formed from 1897 parts of water and 1750 parts of the grinding resin of Preparation B. Then 21 parts of Disperbyk® 110 (Byk-Chemie GmbH of Germany), 14 parts of Lanco Wax®. PE W 1555 (Langer & Co., Germany), 42 parts of carbon black, 420 parts of aluminum hydrosilicate ASP 200 clay (Langer & Co., Germany), 2667 parts of titanium dioxide TI-PURE® R 900 (DuPont, USA) and 189 parts of di-n-butyl tin oxide are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 60.0% by weight (½ h at 180° C.).

Example 1

An electrocoat bath is prepared by combining 1517.98 parts Preparation A, 154.04 parts preparation C, and 1327.98 parts deionized water. The water and Preparation A resin emulsion are combined in a container with constant stirring, and Preparation C is added with stirring. The bath solid contents are 19% by weight.

Both phosphated and bare cold rolled steel 4-inch-by-6-inch panels are coated at 100 to 225 volts (0.5 ampere) in the Example 1 bath at a bath temperature from 88-98° F. (31-36.7° C.) for 2.2 minutes and the coated panels are baked for 28 minutes at 350° F. (177° C.). The deposited, baked coating has a filmbuild of about 0.8 mil (20 μm).

The description is merely exemplary in nature and, thus, variations that do not depart from the gist of the disclosure are a part of the invention. Variations are not to be regarded as a departure from the spirit and scope of the disclosure.

What is claimed is:

1. An aqueous coating composition comprising a binder in water, the binder comprising a resin containing sulfo groups, sulfamyl groups, or a combination of sulfo and sulfamyl groups, wherein the sulfo groups are prepared by reacting an active hydrogen-containing group with an alkane sultone or with 2-sulfobenzoic acid anhydride.

2. An aqueous coating composition according to claim 1, wherein the sulfo or sulfamyl group-containing resin is an epoxy resin.

3. An aqueous coating composition according to claim 2, wherein the sulfo or sulfamyl group-containing resin is electrodepositable.

4. An aqueous coating composition according to claim 2, wherein the epoxy resin is based on bisphenol A.

5. An aqueous coating composition according to claim 1, wherein the sulfo or sulfamyl group-containing resin has a monomer unit selected from the group consisting of

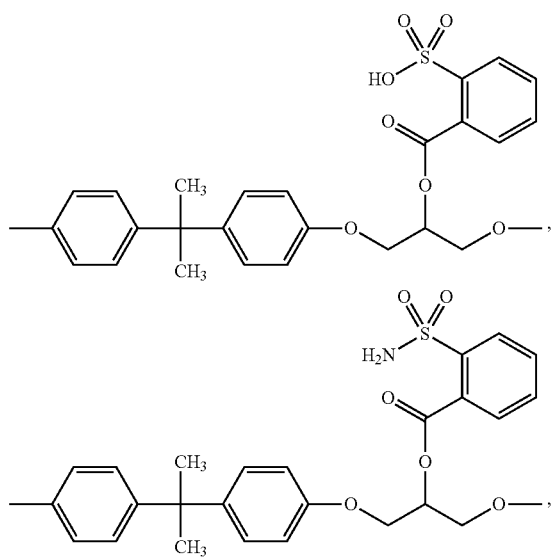

salts thereof, and combinations thereof.

6. An aqueous coating composition according to claim 1, wherein the sulfo or sulfamyl group-containing resin is formed by reaction of a resin with 2-benzoic sulfimide.

7. An aqueous coating composition according to claim 1, wherein the sulfo or sulfamyl group-containing resin comprises, on average, more than one sulfo or sulfamyl group per molecule or comprises, on average, at least one each of a sulfo group and a sulfamyl group per molecule.

8. An aqueous coating composition according to claim 1, wherein the binder comprises from about 0.01 to about 99% by weight of the sulfo or sulfamyl group-containing resin.

9. An aqueous coating composition according to claim 1, wherein the binder further comprises a second amine-functional resin.

10. An aqueous coating composition according to claim 1, wherein the sulfo or sulfamyl group-containing resin is an acrylic resin.

11. An aqueous coating composition according to claim 1, further comprising a crosslinker reactive with the sulfo or sulfamyl group-containing resin.

12. An aqueous coating composition according to claim 11, further comprising a second amine-functional resin reactive with the crosslinker, wherein the second amine-functional resin does not include sulfo or sulfamyl groups.

13. A method of coating a metal automotive vehicle body, comprising:
   (a) cleaning the metal automotive vehicle body;
   (b) placing the cleaned metal automotive vehicle body into an aqueous coating composition according to claim 1;
   (c) connecting the metal automotive vehicle body as a cathode in an electric circuit and passing a current through the aqueous electrodeposition coating composition to deposit a coating layer onto the metal automotive vehicle body.

14. A method of coating an electrically conductive substrate according to claim 13, wherein the metal automotive vehicle body is free of a phosphate pre-treatment.

15. A method of coating an electrically conductive substrate according to claim 13, wherein the sulfo or sulfamyl group-containing resin is an epoxy resin.

16. A method of coating an electrically conductive substrate according to claim 13, wherein the sulfo or sulfamyl group-containing resin is formed by reaction of a resin with 2-benzoic sulfimide.

17. A method of coating an electrically conductive substrate according to claim 13, wherein the sulfo or sulfamyl group-containing resin comprises, on average, more than one sulfo or sulfamyl group per molecule or comprises, on average, at least one each of a sulfo group and a sulfamyl group per molecule.

18. A method of coating an electrically conductive substrate according to claim 13, wherein the sulfo or sulfamyl-containing resin is electrodepositable.

19. A coated substrate prepared according to the method of claim 13.

* * * * *